US011093373B1

(12) United States Patent
Dewitt et al.

(10) Patent No.: US 11,093,373 B1
(45) Date of Patent: Aug. 17, 2021

(54) MULTI-PLATFORM TESTING AUTOMATION

(71) Applicant: MX Technologies, Inc., Lehi, UT (US)

(72) Inventors: Brandon Dewitt, Bluffdale, UT (US); Ryan McBride, Lehi, UT (US); Shane Smit, Lehi, UT (US); Cristian Chirinos, Pleasant Grove, UT (US); Robert Montgomery, West Jordan, UT (US); Garrett Thornburg, Richmond, VA (US); Jonathan Carstens, Idaho Falls, ID (US); Daniel Ries, Provo, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 0 days.

(21) Appl. No.: 16/863,714

(22) Filed: Apr. 30, 2020

Related U.S. Application Data

(63) Continuation of application No. 16/264,109, filed on Jan. 31, 2019, now Pat. No. 10,909,027, which is a
(Continued)

(51) Int. Cl.
*G06F 11/36* (2006.01)
*G06F 11/34* (2006.01)
*G06F 11/30* (2006.01)

(52) U.S. Cl.
CPC ........ *G06F 11/3672* (2013.01); *G06F 11/302* (2013.01); *G06F 11/3006* (2013.01);
(Continued)

(58) Field of Classification Search
CPC ............. G06F 11/3672; G06F 11/3476; G06F 11/3457; G06F 11/3006; G06F 11/3485; G06F 11/302
(Continued)

(56) References Cited

U.S. PATENT DOCUMENTS 7,797,401 B2   9/2010   Stewart et al.
8,538,414 B1   9/2013   Beans et al.
(Continued)

OTHER PUBLICATIONS

Michael Maire et al., Hierarchical Scene Annotation, 2013, unknown.
(Continued)

*Primary Examiner* — Mischita L Henson
(74) *Attorney, Agent, or Firm* — Kunzler Bean & Adamson, PC

(57) ABSTRACT

Apparatuses, systems, methods, and computer program products are presented for multi-platform testing automation. A method includes electrically triggering, with a rotate command, at least one mechanical actuator to rotate a frame to successively present different faces of the frame to a camera of a mobile hardware device. A method includes simulating one or more touch input events on a mobile hardware device with a delay period between each of the simulated one or more touch input events for each successively presented different face of a frame. A method includes receiving data associated with simulated one or more touch input events and a camera of a mobile hardware device from the mobile hardware device over a data network.

20 Claims, 6 Drawing Sheets

Related U.S. Application Data continuation of application No. 15/372,391, filed on Dec. 7, 2016, now Pat. No. 10,353,806.

(60) Provisional application No. 62/264,315, filed on Dec. 7, 2015.

(52) U.S. Cl.
CPC ...... G06F 11/3457 (2013.01); G06F 11/3476 (2013.01); G06F 11/3485 (2013.01)

(58) Field of Classification Search
USPC .......................................................... 714/32
See application file for complete search history.

(56) References Cited

U.S. PATENT DOCUMENTS

| | | | |
|---|---|---|---|
| 9,119,015 | B2 | 8/2015 | Javaid et al. |
| 9,151,693 | B1* | 10/2015 | Yang ........................ H04M 1/24 |
| 9,152,541 | B1* | 10/2015 | Kuo ..................... G06F 11/3664 |
| 2005/0101375 | A1 | 5/2005 | Webb et al. |
| 2007/0022324 | A1 | 1/2007 | Chang et al. |
| 2011/0310041 | A1* | 12/2011 | Williams ............. G06F 11/3696 |
| | | | 345/173 |
| 2012/0188176 | A1* | 7/2012 | Uzelac .................... G06F 3/044 |
| | | | 345/173 |
| 2012/0303310 | A1 | 11/2012 | Musfeldt |
| 2013/0290075 | A1 | 10/2013 | Kathooria et al. |
| 2014/0004852 | A1 | 1/2014 | Lehmann et al. |
| 2014/0033177 | A1 | 1/2014 | Chang et al. |
| 2014/0040871 | A1 | 2/2014 | Schwan et al. |
| 2014/0211021 | A1 | 7/2014 | Roh |
| 2015/0025942 | A1 | 1/2015 | Ross et al. |
| 2015/0039367 | A1 | 2/2015 | Matlack et al. |
| 2019/0079855 | A1* | 3/2019 | Dewitt ................ G06F 11/3692 |

OTHER PUBLICATIONS

U.S. Appl. No. 16/863,714 Office Action dated Sep. 16, 2020.
U.S. Appl. No. 16/264,109 Notice of Allowance dated Sep. 15, 2020.
U.S. Appl. No. 16/863,697 Notice of Allowance dated Sep. 15, 2020.
U.S. Appl. No. 16/264,109 Office Action dated Jul. 1, 2020.

* cited by examiner

MULTI-PLATFORM TESTING AUTOMATION

CROSS-REFERENCES TO RELATED APPLICATIONS

This application is a continuation of U.S. patent application Ser. No. 16/264,109 entitled "MULTI-PLATFORM TESTING AUTOMATION" and filed on Jan. 31, 2019, for Brandon Dewitt, et al., which is a continuation of U.S. patent application Ser. No. 15/372,391 entitled "MULTI-PLATFORM TESTING AUTOMATION" and filed on Dec. 7, 2016, for Brandon Dewitt, et al., which claims the benefit of U.S. Provisional patent Application No. 62/264,315 entitled "MULTI-PLATFORM TESTING AUTOMATION" and filed on Dec. 7, 2015, for Brandon Dewitt, et al., both of which are incorporated herein by reference.

FIELD

This invention relates to testing of mobile hardware devices and more particularly relates to the automated testing of mobile hardware devices over a network.

BACKGROUND

As mobile devices and their software become more complex, the chance for bugs and other errors also increases. It can be a mundane, subjective, and/or inaccurate process for users to manually test each mobile device or software update.

SUMMARY

Apparatuses for multi-platform testing automation are disclosed. In one embodiment, one or more hardware server devices are in communication with at least one mechanical actuator and an array of mobile hardware devices over a data network. At least one mechanical actuator, in some embodiments, provides non-digital physical interaction to at least one mobile hardware device. One or more hardware server devices, in certain embodiments, are configured to simulate one or more touch input events on mobile hardware devices over a data network with a delay period between each of the simulated one or more touch input events. In a further embodiment, one or more hardware server devices are configured to receive data associated with one or more simulated touch input events and/or non-digital physical interaction from mobile hardware devices over a data network.

Other apparatuses for multi-platform testing automation are disclosed. An apparatus, in one embodiment, includes means for rotating a frame to successively present different faces of the frame to a camera of a mobile hardware device. In certain embodiments, an apparatus includes means for simulating one or more touch input events on a mobile hardware device over a data network with a delay period between each of the simulated one or more touch input events for each successively presented different face of a frame. An apparatus, in some embodiments, includes means for receiving data associated with one or more simulated touch input events from a mobile hardware device over a data network.

Methods for multi-platform testing automation are disclosed. In one embodiment, a method includes electrically triggering, with a rotate command, at least one mechanical actuator to rotate a frame to successively present different faces of the frame to a camera of a mobile hardware device. A method, in a further embodiment, includes simulating one or more touch input events on a mobile hardware device with a delay period between each of the simulated one or more touch input events for each successively presented different face of a frame. In some embodiments, a method includes receiving data associated with one or more simulated touch input events and a camera of a mobile hardware device from the mobile hardware device over a data network.

Computer program products comprising a computer readable storage medium are presented. In certain embodiments, a computer readable storage medium stores computer usable program code executable to perform one or more of the operations described with regard to the disclosed methods, apparatuses, and systems.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1A:
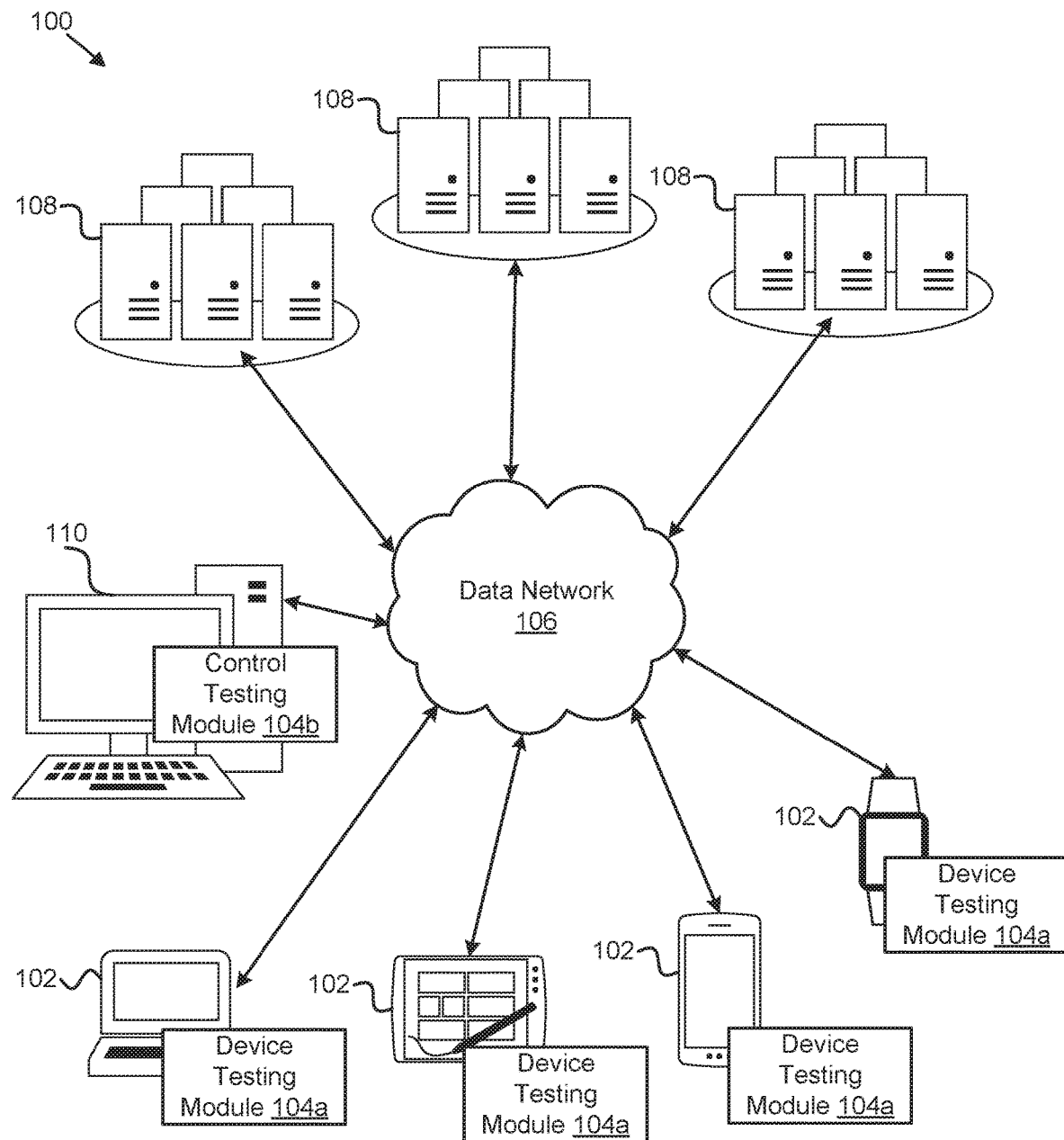
FIG. 1A is a schematic block diagram illustrating one embodiment of a system for automated testing.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (e.g., including firmware, resident software, micro-code, etc. stored on a non-transitory computer readable storage medium) or an embodiment combining software and hardware aspects that may all generally be referred to herein as a "circuit," "module," or "system." Furthermore, aspects of the present invention may take the form of a computer program product embodied in one or more non-transitory computer readable storage medium(s) having program code embodied thereon.

Many of the functional units described in this specification have been labeled as modules, in order to more particularly emphasize their implementation independence. For example, a module may be implemented as a logic hardware circuit comprising custom VLSI circuits or gate arrays (e.g., an application specific integrated circuit), off-the-shelf semiconductors such as logic chips, transistors, and/or other discrete components. A module may also be implemented in one or more programmable hardware devices such as field programmable gate arrays, programmable array logic, programmable logic devices, or the like.

Modules may also be implemented at least partially in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more non-transitory computer readable storage media. A computer program product may include a non-transitory computer readable storage medium (or media) storing computer readable program instructions thereon for causing a processor to carry out aspects of the present invention.

A computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM"), a semiconductor memory device (e.g., NAND Flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), or the like), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and/or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, script instructions, machine dependent instructions, microcode, firmware instructions, state-setting data, or either source code or object code written in any combination of one or more programming languages, including an object oriented programming language such as Smalltalk, C++, Java, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Figure 1B:
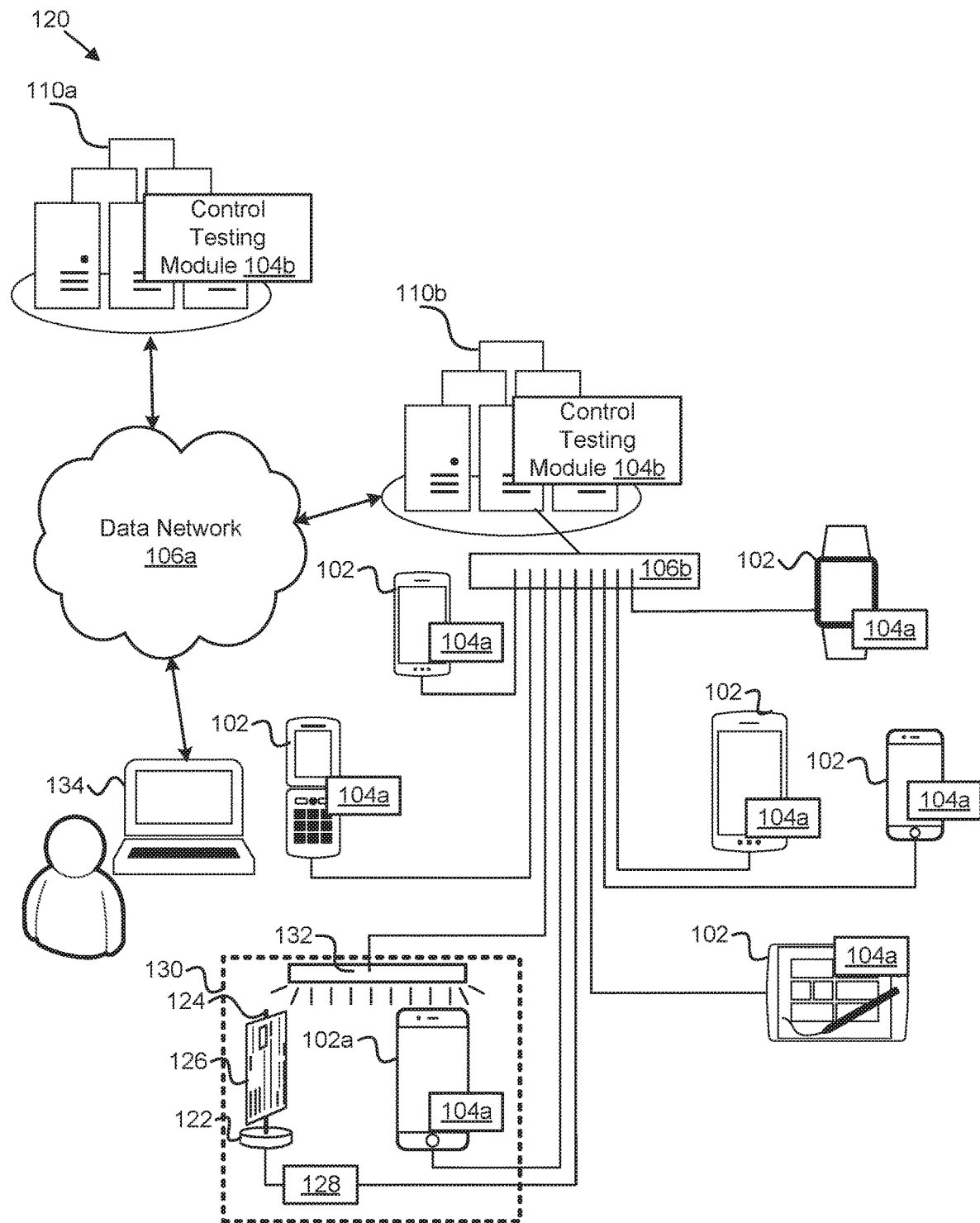
FIG. 1B is a schematic block diagram illustrating a further embodiment of a system for automated testing.

FIG. 1A depicts one embodiment of a system 100 for automated testing of software and/or hardware. In one embodiment, the system 100 includes one or more devices 102 (e.g., hardware devices such as mobile hardware devices, virtual devices, simulated devices, and/or the like), one or more testing modules 104 (e.g., one or more control testing modules 104b and/or a plurality of testing modules 104a disposed on the one or more devices 102), one or more data networks 106 or other communication channels, one or more third party service providers 108 (e.g., one or more servers 108 of one or more service providers 108; one or more cloud or network service providers 108, or the like), and/or one or more hardware testing server devices 110. In certain embodiments, even though a specific number of devices 102, testing modules 104, data networks 106, third party service providers 108, and/or hardware testing server devices 110 are depicted in FIGS. 1A and 1B, one of skill in the art will recognize, in light of this disclosure, that any number of devices 102, testing modules 104, data networks 106, third party service providers 108, and/or hardware testing server devices 110 may be included in the system 100 for testing.

In one embodiment, the system 100 includes one or more devices 102. The devices 102 (e.g., one or more hardware devices, computing devices, information handling devices, virtual devices, and/or simulated devices) may include one or more of a desktop computer, a laptop computer, a mobile device, a tablet computer, a smart phone, a set-top box, a gaming console, a mobile gaming device, a smart TV, a smart watch, a fitness band, an optical head-mounted display (e.g., a virtual reality headset, smart glasses, or the like), an HDMI or other electronic display dongle, a USB dongle, a personal digital assistant, and/or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the devices 102 are in communication with one or more hardware testing server devices 110 via a data network 106, described below. The devices 102, in a further embodiment, are capable of executing various programs, program code, applications, instructions, functions, or the like.

In one embodiment, the one or more testing modules 104 automate testing of hardware and/or software of one or more devices 102. For example, one or more testing modules 104 may enable testing (e.g., quality assurance, troubleshooting, customer service, debugging, reverse engineering, or the like) of one or more applications executing on one or more devices 102, of one or more operating systems executing on one or more devices 102, of hardware of one or more devices 102, or the like. In certain embodiments, one or more testing modules 104 may test a plurality of different devices 102 (e.g., running the same app, running different apps, or the like) in parallel, even if the different devices 102 are from different platforms (e.g., desktop platforms such as Microsoft® Windows®, Apple® OS X®, Linux®, or the like; mobile platforms such as Apple® iOS, Google® Android®, or the like; and/or other platforms).

In one embodiment, a testing module 104 comprises a control testing module 104b in communication with one or more device testing modules 104a over a data network 106, internally within the same hardware testing server device 110 or other hardware computing device 110 (e.g., for one or more virtualized and/or simulated devices 102), and/or otherwise in communication with one or more device testing modules 104*a*. For example, a control testing module 104*b* may create a TCP/IP socket connection to a device 102, to a device testing module 104*a*, or the like.

A control testing module 104*b* may provide simulated and/or automated user input to one or more devices 102 (e.g., to a device 102 itself, to an operating system of a device 102, to a device testing module 104*a* located on a device 102, or the like) over a data network 106 (e.g., using a TCP/IP socket connection or the like), such as one or more key presses, one or more button presses, and/or one or more other touch input events (e.g., one or more taps, swipes, pinches, drags, keystrokes), or the like. Simulated and/or automated user input, such as a touch input event, instead of comprising an actual user touch of a touchscreen, touchpad, or the like, may comprise a command provided over a data network 106 or other digital communications channel, triggering a user input event, a touch input event, or the like remotely (e.g., in an automated fashion). A simulated and/or automated user input event such as a touch input event may have the same or similar effect on a hardware device 102 receiving the simulated and/or automated user input event as an actual user input event performed and/or triggered directly by an actual user.

A control testing module 104*b* and/or a device testing module 104*a*, in certain embodiments, may pause or wait a delay period between automated and/or simulated user interface commands (e.g., user input events, touch input events, or the like), to simulate input provided by an actual user, with natural pauses, delays, and/or timing. In a further embodiment, a user may manually step through a script or other list of commands and/or user input events, using a graphical user interface (GUI) of a control testing module 104*b* (e.g., by selecting a "next" button, or the like).

A testing module 104 (e.g., a control testing module 104*b*, a device testing module 104*a*, and/or a combination of both) may receive, audit, review, and/or provide an administrator or other user with access to data from a device 102 and/or application before, during, and/or after a trigger, such as executing an operation, providing a simulated and/or automated user input event such as a touch input event, satisfying a time period or timer, or the like (e.g., error data such as state information for a hardware device 102, an application, and/or an operating system; a screenshot; a hierarchical scene tree and/or nodes thereof; a system file; an application file; a database; a database table; a database record; a log; a log entry; a value for a runtime variable of an application and/or operating system; a value for a memory pointer used by an application and/or operation; a network communication such as an API request or a query or the like; an identifier of a hardware device 102; an identifier of an application executing on a hardware device 102; or the like).

For example, in certain embodiments, a testing module 104*a* on a device 102 may provide a control testing module 104*b* with a screenshot from the device 102 and/or an associated application, with a data structure (e.g., a file, a database, a database table, a database record, a log or log entry, a value for a variable, a value for a pointer, or the like) from the device 102 and/or an associated application, with a communication (e.g., one or more data packets, a payload, an API request, a query, or other input/output (I/O) data to or from the device 102 and/or an associated application), with one or more identifiers of and/or execution data for one or more executing processes (e.g., data from volatile memory, data from a file system, data from a run-time stack, or the like), with an identifier of a device 102 (e.g., a make, a model, a manufacturer, a vendor, a version number, a name, or the like), with an identifier of an application executing on a device 102 (e.g., an application name, an application version number, an operating system version, or the like) and/or other data. In one embodiment, an administrator or other user may query and/or request data from a device 102 and/or an associated application using an interface (e.g., a web interface, a GUI, an API, a CLI, or the like) of a control testing module 104*b* (e.g., which may forward and/or relay the request to a device testing module 104*a*, which may return the requested data from a hardware device 102).

In one embodiment, an administrator or other user may write and/or provide to a GUI of a control testing module 104*b* (e.g., providing user input to a web interface over a data network 106, providing user input locally to a user input device of a hardware testing server device 110 such as a keyboard and/or mouse, or the like) a script or other list of multiple commands and/or user input events (e.g., touch input events) to be simulated or otherwise executed on one or more devices 102 by one or more device testing modules 104*a*. A control testing module 104*b* may provide a library of scripts, a library of commands, a library of user input events, or the like for a user to reference and/or include in a script. A control testing module 104*b* may provide a user with a GUI in which the user may build a script using one or more sub-scripts, user input events, supported commands, or the like. A control testing module 104*b* may communicate one or more commands of a script from a hardware testing server device 110 to one or more testing devices 102 (e.g., in parallel). In certain embodiments, a control testing module 104*b* may translate a command and/or a script for different platforms and/or devices 102. In a further embodiment, different device testing modules 104*a* may translate a command and/or a script for executing on their associated devices 102.

In certain embodiments, a script may walk through and/or test an entire GUI of an application executing on a device 102, a portion of a GUI of an application executing on a device 102, or the like (e.g., using a script, in response to separate commands or other user input from a user, without a script simulating a sequence of random user input events such as touch input events, without a script systematically performing an exhaustive or substantially exhaustive sequence of user input events such as touch input events for each location and/or user input element of the GUI or portion thereof, or the like).

In one embodiment, while one or more testing modules 104 execute commands and/or simulated user interface events, the different devices 102 being tested may display the associated interactions graphically on the electronic displays of the devices 102. A device testing module 104*a*, in certain embodiments, may visually highlight or otherwise mark a user interface element (e.g., a button, a text field, a radio button, a checkbox, a slider, a dial, or the like) associated with a simulated user interface event such as a touch input event. A GUI of a control testing module 104*b*, in certain embodiments, may display a scene tree or other listing of user interface elements to a user (e.g., which may be received from a device 102, which a user may select to view additional data, which a user may select to automatically include in a script, or the like). In certain embodiments, instead of and/or in addition to executing a script, a control testing module 104*b* may provide an interface allowing a user to provide input (e.g., one or more simulated user input events) to a hardware testing server device 110 (e.g., directly to a hardware testing server device 110, on a different device 102 in communication with a hardware testing server device 110 over a data network 106, over a web interface of a hardware testing server device 110, or the like), and may mirror the provided input (e.g., touch input events) on one or more testing devices 102 (e.g., which may actually receive the provided input in independently executing applications on the different devices 102, as touch input events or the like, instead of simply mirroring a display). A control testing module 104b may simulate one or more touch input events or other user input events (e.g., mirrored, based on a script, or the like) on different devices 102 by screen location (e.g., x and y coordinates or the like), by user interface element (e.g., a label or other identifier for a node in a hierarchical screen tree representing a displayed object so that the event is interpreted similarly even for different screen orientations, different versions of an application, or the like), and/or using a different input location identifier.

In a further embodiment, one or more device testing modules 104a may maintain a log or other testing data structure, with entries and/or records for a plurality of events (e.g., errors, failures, executing an operation, providing simulated and/or automated user input, satisfying a time period or timer, or the like). A device testing module 104a, in certain embodiments, may include testing data and/or references to testing data in the log or other testing data structure (e.g., screenshots, memory dump, variable values, pointer values, or the like). For example, a device testing module 104a may automatically gather testing data (e.g., take a screenshot, save a memory dump, or the like) in response to an error, a failure, providing a simulated user input event, and/or another trigger. In one embodiment, a user may define what testing data is stored in a log or other testing data structure using a GUI of a control testing module 104b, or the like. A device testing module 104a may store a log or other testing data structure on a device 102 and/or may stream or forward a log or other testing data structure to a control testing module 104b on a hardware testing server device 110. A control testing module 104b may display one or more logs to a user in a GUI on an electronic display of a hardware testing server device 110, remotely on a webpage served from a hardware testing server device 110 over a data network 106, or the like.

In one embodiment, a control testing module 104b may display to a user a list of one or more supported and/or testing enabled devices 102, on the same data network 106, registered with the same account, or the like. A user, in certain embodiments, may select one or more devices 102 from the displayed list for testing (e.g., executing a script, mirroring provided input, or the like). A user, in a further embodiment, may select one or more scripts, commands, touch input events, and/or user input events for executing on and/or providing to the selected one or more devices 102.

In certain embodiments, a control testing module 104b may push or otherwise send data to a device 102 and/or to a device testing module 104a on a device 102, such as an application or other executable code for testing (e.g., automated code deployment for testing, quality assurance, troubleshooting, or other purposes), variable values, pointer values, data files, data for storing in volatile memory of a device 102, or the like. A control testing module 104b may determine data to push or send based on user input (e.g., selected and/or defined by a user), from a script, from a settings file, or the like.

A control testing module 104b, in certain embodiments, may connect to a device 102 in response to an end-user request from the device 102 itself, to troubleshoot and/or provide customer support to the user, or the like. In a further embodiment, a control testing module 104b may connect to one or more devices 102 (e.g., a single device 102, a plurality of many devices 102, or the like) as part of an automated quality assurance process, prior to providing the one or more devices 102 and/or to a software application to a vendor, to customers, or the like. For example, a control testing module 104b may test various aspects of an application, may collect data for comparison and/or review, or the like in an automated fashion, from multiple different devices 102, instead of or in addition to requiring manual testing by multiple quality assurance engineers, or the like.

In one embodiment, a control testing module 104b may be configured to test devices 102 and/or applications or operating systems thereof based on updates to a repository of computer executable code (e.g., a code repository hosting service, a version control and/or source code management system, a source code file, a directory, or the like). A control testing module 104b may monitor a repository of computer executable code to detect a code commit, a code commit of a predefined type, a predefined number of code commits, a commit to a predefined or flagged portion of code, and/or another update to computer executable code of the repository.

In response to detecting an update, a control testing module 104b may automatically and/or dynamically generate one or more builds for hardware devices 102 using the updated computer executable code. For example, a control testing module 104b may compile or otherwise build different versions of the updated computer executable code (e.g., using different compilers, different compiler flags or settings, different compiler targets, or the like) for different devices 102 (e.g., different makes and/or models), devices 102 with different operating systems and/or operating system versions, or the like. The computer executable code of the monitored repository may comprise at least a portion of a device testing module 104a, one or more hooks or interfaces for a device testing module 104a, a shared library for a device testing module 104a, or the like.

A control testing module 104b may automatically and/or dynamically install the one or more builds (e.g., compiled applications, operating systems, firmware, or the like) on a plurality of hardware devices 102, over a data network 106 or the like. A control testing module 104b may automatically and/or dynamically (e.g., with little or no user input) perform one or more testing protocols (e.g., a predefined test script or other list of instructions comprising one or more user input events such as touch input events, a predefined set of tests comprising one or more simulated user input events such as touch input events, or the like). In response to performing one or more testing protocols, a control testing module 104b may receive data from the tested devices 102, such as the error data described above (e.g., state information for a hardware device 102, an application, and/or an operating system; a screenshot; a hierarchical scene tree and/or nodes thereof; a system file; an application file; a database; a database table; a database record; a log; a log entry; a value for a runtime variable of an application and/or operating system; a value for a memory pointer used by an application and/or operation; a network communication such as an API request or a query or the like; an identifier of a hardware device 102; an identifier of an application executing on a hardware device 102; or the like).

In one embodiment, a control testing module 104b may be used to gather information from a device 102 and/or an application, for testing and/or investigation purposes. For example, a testing module 104 may monitor and/or test I/O from an application, files associated with and/or used by an application, data in volatile memory of an application, to test and/or determine a quality or correctness of an API connection between a device 102 or application and a server 108, an authentication process or procedure used by a device 102 or application and a server 108, functions executed and/or supported between a server 108 and a device 102 or application, data transmitted between a device 102 or application and a server 108, a format of a request and/or of data between a device 102 or application and a server 108, or the like. By capturing such information, a testing module 104 may allow a user to troubleshoot and/or debug a device 102 or application, to replicate and/or improve the functionality of a device 102 and/or application (e.g., in another device 102 and/or application), to discover and take advantage of one or more services (e.g., APIs) provided by a server 108, or the like.

One or more devices 102 may comprise a virtualized and/or simulated device 102, executing on a hardware testing server device 110 or other computing hardware 110. A virtualized and/or simulated device 102 may execute a foreign code base (e.g., an application or other computer executable program code) for testing, as described above, in a sandbox environment or the like.

In certain embodiments, a control testing module 104b may manage a pool of internet protocol (IP) addresses for one or more devices 102 and/or associated applications. For example, in embodiments where multiple physical, virtual, and/or simulated devices 102 are used for distributed and/or decentralized downloading/aggregation of user data from one or more third party service providers 108, as described below, a control testing module 104b may ensure that the same IP address or set of one or more IP addresses is used for the same user, that IP addresses are rotated, or the like to avoid undue suspicion and/or blocking by a third party service provider 108, allowing the user to access his/her own data (e.g., a user's photos, a user's social media posts, a user's medical records, a user's financial transaction records or other financial data, and/or other data associated with and/or owned by a user but stored by a server 108 of a third party service provider 108).

In one embodiment, a testing module 104 is configured to determine and/or receive a user's electronic credentials (e.g., username and password, fingerprint scan, retinal scan, digital certificate, personal identification number (PIN), challenge response, security token, hardware token, software token, DNA sequence, signature, facial recognition, voice pattern recognition, bio-electric signals, two-factor authentication credentials, or the like) for one or more third party service providers 108. The testing module 104, in certain embodiments, accesses a server 108 of a third party service provider 108 using a user's electronic credentials to download data associated with the user from the server 108, such as a user's photos, a user's social media posts, a user's medical records, a user's financial transaction records or other financial data, and/or other data associated with and/or owned by a user but stored by a server 108 of a third party service provider 108 (e.g., stored by hardware not owned, maintained, and/or controlled by the user). The testing module 104, in various embodiments, may provide the downloaded data to the user locally (e.g., displaying the data on an electronic display of a device 102); may provide the downloaded data from the device 102 of the user to a remote server 110 (e.g., a control testing module 104b) which may be unaffiliated with the third party service provider 108; may provide one or more alerts, messages, advertisements, or other communications to the user (e.g., on a device 102) based on the downloaded data; or the like.

In certain embodiments, the system 100 includes a plurality of testing modules 104 disposed/located on devices 102 of a plurality of different users (e.g., comprising hardware of and/or executable code running on one or more devices 102). The plurality of testing modules 104 may act as a distributed and/or decentralized system 100, executing across multiple devices 102, which are geographically dispersed and using different IP addresses, each downloading and/or aggregating data (e.g., photos, social media posts, medical records, financial transaction records, other financial data, and/or other user data) separately, in a distributed and/or decentralized manner. While a third party service provider 108 (e.g., a financial institution, bank, credit union, and/or other online banking provider; a social media site; a medical provider; a photo hosting site; or the like) may block a data aggregation service or other entity from accessing data for a plurality of users from a single location (e.g., a single IP address, a single block of IP addresses, or the like), a distributed and/or decentralized swarm of many testing modules 104, in certain embodiments, may be much more difficult for a third party service provider 108 to block.

In one embodiment, a device 102 may include and/or execute an internet browser, which a user may use to access a server 108 of a third party service provider 108 (e.g., by loading a webpage of the third party service provider 108 in the internet browser). At least a portion of a testing module 104, in certain embodiments, may comprise a plugin to and/or an extension of an internet browser of a user's personal device 102, so that a third party service provider 108 may not block the testing module 104 from accessing the server 108 of the third party service provider 108 without also blocking the user's own access to the server 108 using the internet browser. For example, the testing module 104 may use the same cookies, IP address, saved credentials, or the like as a user would when accessing a server 108 of a third party service provider 108 through the internet browser. In certain embodiments, the testing module 104 may support integration with multiple different types of internet browsers (e.g., on different devices 102).

A testing module 104, in certain embodiments, may mimic or copy a user's behavioral pattern in accessing a server 108 of a third party service provider 108, to reduce a likelihood that the third party service provider 108 may distinguish access to the server 108 by a testing module 104 from access to the server 108 by a user. For example, a testing module 104 may visit one or more locations (e.g., webpages) of a server 108 of a third party service provider 108, even if the testing module 104 does not intend to download data from each of the one or more locations, may wait for a certain delay time between accessing different locations, may use a certain scroll pattern, or the like, to mask the testing module 104's downloading and/or aggregating of a user's data, to reduce the chances of being detected and/or blocked by the third party service provider 108.

In one embodiment, at least a portion of a testing module 104 may be integrated with or otherwise part of another application executing on a device 102, such as a personal financial management application (e.g., computer executable code for displaying a user's financial transactions from multiple financial institutions, determining and/or displaying a user's financial budgets and/or financial goals, determining and/or displaying a user's account balances, determining and/or displaying a user's net worth, or the like), a photo viewer, a medical application, an insurance application, an accounting application, a social media application, or the like, which may use data the testing module 104 downloads from a server 108 of a third party service provider 108.

In one embodiment, the testing modules 104a comprise a distributed system 100, with the testing modules 104a and/or the associated devices 102 being tested, executing builds of applications, downloading data, or the like substantially independently (e.g., without a global clock, with independent success and/or failure of components). Distributed testing modules 104a may pass messages to each other and/or to a control testing module 104b, to coordinate testing, execution of builds of applications, display of objects associated with nodes of scene trees, or the like. In one embodiment, the testing modules 104a are decentralized (e.g., peer devices 102, associated with users or the like), rather than relying exclusively on a centralized server or other device to perform one or more testing functions.

In a distributed and/or decentralized system 100, a central entity, such as a control testing module 104b and/or a hardware testing server device 110, in certain embodiments, may still provide, to one or more testing modules 104a, one or more messages comprising instructions for automated testing, remote user input for testing, adjusted and/or updated parameters of a scene tree, or the like. In a further embodiment, one or more testing modules 104a may pass messages to each other, such as instructions for automated testing, remote user input for automated testing, adjusted and/or updated parameters of a scene tree, or the like, in a peer-to-peer manner. In another embodiment, a central entity, such as a control testing module 104b, may initially seed one or more sets of instructions and/or other data for automated testing, and the one or more testing modules 104a may send it to other testing modules 104a.

The one or more testing modules 104, in certain embodiments, may provide an interface (e.g., an application programming interface (API), a TCP/IP socket connection, or the like) to provide error data; screenshots; mirrored actions, objects, and/or commands; or the like to one or more other entities (e.g., another testing module 104, another hardware device 102, 110, or the like). The interface, in one embodiment, comprises a private interface between testing modules 104a of users' devices 102 and one or more control testing modules 104b. For example, this may enable a control testing module 104b to receive data from a testing module 104a on a user's device 102, provide a testing module 104a instructions, mirror input between devices 102, or the like. In another embodiment, the interface comprises a public and/or open interface, which may be secured and/or limited to authorized users, allowing a user to share access to the user's device 102 with one or more different control testing modules 104b (e.g., administrators, customer service, and/or quality assurance representatives for one or more applications, operating systems, hardware, or the like of a hardware device 102) for automated testing and/or troubleshooting (e.g., remotely).

In various embodiments, a testing module 104 may be embodied as hardware, software, or some combination of hardware and software. In one embodiment, a testing module 104 may comprise executable program code stored on a non-transitory computer readable storage medium for execution on a processor of a device 102, a hardware testing server device 110, or the like. For example, a testing module 104 may be embodied as executable program code executing on one or more of a device 102, a hardware testing server device 110, a combination of one or more of the foregoing, or the like. In such an embodiment, the various modules that perform the operations of a testing module 104, as described below, may be located on a device 102, a hardware testing server device 110, a combination of the two, and/or the like.

In various embodiments, a testing module 104 may be embodied as a hardware appliance that can be installed or deployed on a hardware testing server device 110, on a user's device 102 (e.g., a dongle or other peripheral device), or elsewhere on the data network 106. In certain embodiments, a testing module 104 may comprise a hardware device such as a secure hardware dongle or other hardware appliance device (e.g., a set-top box, a network appliance, or the like) that attaches to another device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like). A hardware appliance of a testing module 104 may comprise a power interface, a wired and/or wireless network interface, a graphical interface that attaches to a display, and/or a semiconductor integrated circuit device as described below, configured to perform the functions described herein with regard to a testing module 104.

A testing module 104, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, a testing module 104 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of a testing module 104.

The semiconductor integrated circuit device or other hardware appliance of a testing module 104, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of a testing module 104 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more third party service providers 108, in one embodiment, may include one or more network accessible computing systems such as one or more web servers hosting one or more web sites, an enterprise intranet system, an application server, an application programming interface (API) server, an authentication server, or the like. The one or more third party service providers 108 may include systems related to various institutions or organizations. For example, a third party service provider 108 may include a system providing electronic access to a financial institution, a university, a government agency, a utility company, an email provider, a social network, a photo sharing site, a video sharing site, a data storage site, a medical provider, or another entity that stores data associated with a user. A third party service provider 108 may allow users to create user accounts to upload, view, create, and/or modify data associated with the user. Accordingly, a third party service provider 108 may include an authorization system, such as a login element or page of a web site, application, or similar front-end, where a user can provide credentials, such as a username/password combination, to access the user's data.

In one embodiment, the one or more hardware testing server devices 110 and/or one or more control testing modules 104b provide central management of the networked swarm of testing modules 104a. For example, the one or more control testing modules 104b and/or a hardware testing server device 110 may store downloaded testing data and/or error data from the testing modules 104a centrally, may provide instructions and/or settings for the testing modules 104a, or the like. A hardware testing server device 110 may include one or more servers located remotely from the devices 102 and/or the one or more third party service providers 108. A hardware testing server device 110 may comprise hardware of a testing module 104, may store executable program code of a testing module 104 in one or more non-transitory computer readable storage media, and/or may otherwise perform one or more of the various operations of a testing module 104 described herein in order to perform automated testing.

FIG. 1B depicts one embodiment of a system 120 for automated testing. The system 120 of FIG. 1B is substantially similar to the system 100 of FIG. 1A, but with two cooperating hardware server devices 110a, 110b on a first data network 106a and an array of mobile hardware devices 102 on a second data network 106b, with one or more of the mobile hardware devices 102 disposed in an enclosure 130 with a light source 132 and a mechanical actuator 122 supporting a frame 124 with an object 126 coupled thereto and controlled by a microcontroller 128.

In one embodiment, a second hardware server device 110b is in communication with and/or manages the array of mobile hardware devices 102 over the second data network 106b. For example, the second data network 106b may comprise one or more peripheral serial bus interconnects, such as universal serial bus (USB) connections to the mobile hardware devices 102, Apple® Lightning® connections, serial peripheral interface (SPI) buses, IEEE 1394 (e.g., FireWire) connections, or the like; one or more wireless connections, such as Bluetooth®, near field communications (NFC), Wi-Fi, a mobile data network, or the like; a wired network such as Ethernet, a local area network (LAN), a wide area network (WAN) such as the internet, or the like; and/or another set of communications channels communicatively coupled to the mobile hardware devices 102 and the second hardware server device 110b. In one embodiment, one or more of the mobile hardware devices 102 receive electrical power (e.g., charge a battery) over the second data network 106b). In the depicted embodiment, the second data network 106b comprises one or more USB hubs connected to the second hardware server device 110b and each of the mobile hardware devices 102, to charge the mobile hardware devices 102 and to provide the second hardware server device 110b access to the mobile hardware devices 102 for automated testing, simulating touch input events, or the like.

The first hardware server device 110a, in certain embodiments, communicates with the second hardware server device 110b and/or provides a user interface (e.g., a GUI, a web interface, an API, a CLI, or the like) to one or more user hardware devices 134 over the first data network 106a (e.g., a wireless network such as Wi-Fi, a mobile data network, or the like; a wired network such as Ethernet, a local area network (LAN), a wide area network (WAN) such as the internet, or the like; and/or another communications channel). For example, the second hardware server device 110b may provide one or more addresses for the array of mobile hardware devices 102 (e.g., IP addresses, TCP/IP ports, MAC or other hardware addresses, or the like) to the first hardware server device 110a, and the first hardware server device 110a may provide an interface to one or more user hardware devices 134 to provide one or more scripts, commands, test protocols, or the like, to view data received from the array of mobile hardware devices 102 (e.g., error data such as state information for a mobile hardware device 102, an application, and/or an operating system; a screenshot; a hierarchical scene tree and/or nodes thereof; a system file; an application file; a database; a database table; a database record; a log; a log entry; a value for a runtime variable of an application and/or operating system; a value for a memory pointer used by an application and/or operation; a network communication such as an API request or a query or the like; an identifier of a mobile hardware device 102; an identifier of an application executing on a mobile hardware device 102; or the like). In other embodiments, the functionality of the first hardware server 110a and second hardware server 110b or a portion thereof may be combined in a single hardware server 110, may execute on a user hardware device 134, or the like.

In the depicted embodiment, the light source 132 and the microcontroller 128 are also in communication with the second hardware server device 110b over the second data network 106b (e.g., plugged into a USB hub 106b or the like). The microcontroller 128 controls at least one mechanical actuator 122 (e.g., placing the at least one mechanical actuator 122 in communication with the second hardware server device 110b or the like) to provide non-digital physical interaction to at least one of the mobile hardware devices 102a, for testing purposes or the like. For example, in various embodiments, one of the mobile hardware devices 102a may be disposed adjacent to a mechanical actuator 122, several of the mobile hardware devices 102a may be disposed adjacent to a mechanical actuator 122, each of the mobile hardware devices 102a may be disposed adjacent to a mechanical actuator 122, or the like.

In different embodiments, different types of mechanical actuators 122 may be used for different testing purposes. For example, to test one or more camera functions of a mobile hardware device 102a (e.g., a mobile check deposit function, a white balance function, a focus function, a flash function, or the like), a mechanical actuator 122 may present multiple faces 126 and/or objects 126 to a camera of the mobile hardware device 102a, in coordination with one or more simulated touch input events on the mobile hardware device 102a (e.g., tapping a camera button, a mobile deposit button, a focus button, a white balance button, a camera function button, or the like). In one embodiment, a mechanical actuator 122 may comprise a rotary motor such as a servomotor, a stepper motor, or the like, coupled to a frame 124 to rotate the frame 124 in response to a rotate command from a hardware server device 110a, 110b (e.g., to successively present different faces 126 of the frame 124 to a camera of a mobile hardware device 102a or the like, such as presenting a front and a back of a check or other negotiable instrument for automatically testing a mobile check deposit function or the like). In the depicted embodiment, the mechanical actuator 122 is coupled to a frame 124 (e.g., a wire frame, a dowel frame, a rod frame, a T frame, a square frame, a rectangular frame, or the like).

In a further embodiment, a mechanical actuator 122 may be coupled to a mobile hardware device 102a, instead of or in addition to a mechanical actuator 122 coupled to a frame 124. For example, a rotary motor mechanical actuator 122 may rotate a mobile hardware device 102a to direct a camera at different images disposed around the mobile hardware device 102a, a linear actuator 122 may move a mobile hardware device 102a closer to or further away from an image 126 and/or another object, or the like.

While a single mechanical actuator 122 with a single check 126 or other visual object 126 is depicted, in a further embodiment, the mechanical actuator 122 may comprise a carousel with a plurality of additional mechanical actuators 122 (e.g., rotary motors) coupled to a carousel frame 124, so that the mechanical actuator 122 may rotate the carousel frame 124, and each of the additional mechanical actuators 122 within the carousel frame may rotate sub-frames 124 for each of the different faces 126 of the carousel frame 124 to present different surfaces of the different faces 126 (e.g., a front surface and a back surface, three surfaces, four surfaces, five surfaces, of the like) to a camera of a mobile hardware device 102 in response to a different rotate command from a hardware service device 110a, 110b (e.g., a sub-rotate command or the like). In this manner, in certain embodiments, many more image objects 126 or faces 126 may be presented to the same camera of a mobile hardware device 102a in an automated manner (e.g., for testing a mobile check deposit application with the front and back of multiple different checks, to present multiple different images to train machine learning, to test a camera function such as focus or white balance with multiple different images, or the like).

In a further embodiment, a mechanical actuator 122 may comprise a linear actuator (e.g., a screw type linear actuator, a wheel and axle type linear actuator, a cam type linear actuator, or the like) coupled to a frame 124, coupled to a mobile hardware device 102a, or the like to adjust a distance between a frame 124 and a mobile hardware device 102a in response to a distance command from a hardware server device 110a, 110b (e.g., a frame 124 may be aligned with a camera of a mobile hardware device 102a and the distance adjusted by the linear actuator 122 may comprise a front focal distance between the camera and the frame 124, a wireless communications device such as a Bluetooth® beacon or an NFC device may be disposed on the frame 124 so that the linear actuator 122 adjusts the distance between the wireless communications device and a mobile hardware device 102a which may be in communication with the wireless communications device, or the like).

In the depicted embodiment, an enclosure 130 (e.g., a box, a container, a housing, a casing, or the like) houses one or more mobile hardware devices 102a. An enclosure 130 may block some or all external light from entering the enclosure 130, and may comprise a light source 132 (e.g., incandescent, luminescent, fluorescent, light emitting diode (LED), gas discharge, electric arc, or the like) controllable by one or more hardware server devices 110a, 110b to test a mobile hardware device 102a (e.g., a camera, a touchscreen, or the like) in different, controlled, lighting conditions. For example, a mechanical actuator 122 may also be disposed within an enclosure 130 and a control testing module 104b may cooperate with a device testing module 104a on a mobile hardware device 102a to take one or more photos of different faces 126 coupled to a frame 124 of the mechanical actuator 122 in different lighting conditions, or the like.

In a further embodiment, one or more simulated fingers (e.g., of a conductive or semi-conductive material, of a gelatin or other organic material, or the like) may be disposed on a frame 124 of a mechanical actuator 122, which may place the one or more simulated fingers (e.g., in response to a command from a hardware server device 110a, 110b) temporarily into contact with (e.g., touching) a fingerprint scanner or sensor of a mobile hardware device 102a, to test the sensor or the like.

Figure 2:
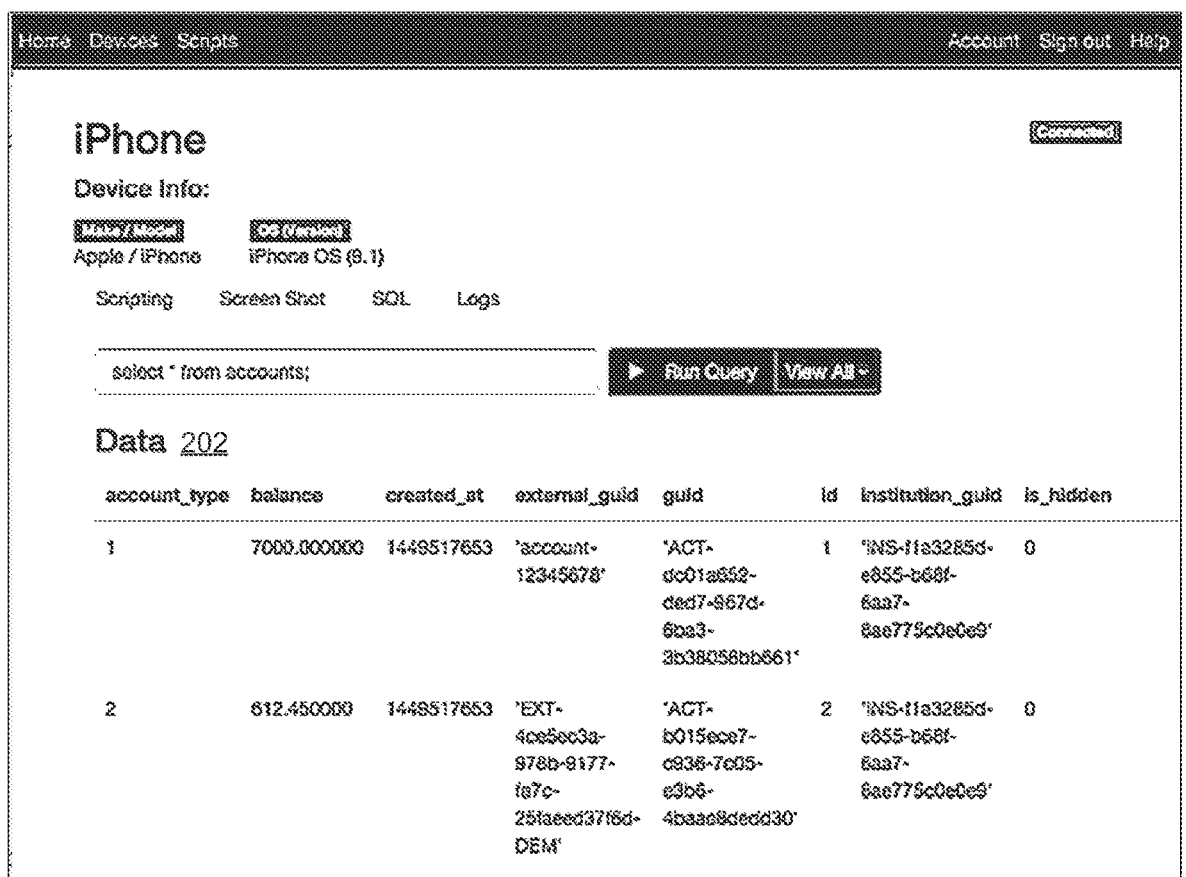
FIG. 2 is a schematic block diagram of one embodiment of a graphical user interface for automated testing.

FIG. 2 depicts one embodiment of a graphical user interface (GUI) 200 for automated testing. A GUI 200 may be provided to a user by a control testing module 104b. A GUI 200 may list one or more connected/available devices 102, which are selectable for testing (e.g., executing a script, mirroring, executing a testing protocol, or the like), may list a status, a device number, a device name, an application version, a make/model, an operating system version, or the like. A GUI 200 may allow a user to select a script, to run a selected script, to run a script on only selected devices 102, to run a selected script on all devices 102, to refresh a list of connected/available devices 102, to select and/or view a listing of disconnected/unavailable devices 102, or the like.

A GUI 200 may be provided to a user by a control testing module 104b to display a screenshot from a device 102. A GUI 200 may allow a user to select an interface for scripting (e.g., creating and/or selecting a script or other list of commands and/or simulated user input events), an interface for querying a data store of a device 102 (e.g., an SQL query or other database query), an interface for viewing one or more logs from a device 102.

In the depicted embodiment, the GUI 200 displays results of a query performed on a device 102 (e.g., a hardware device 102, a simulated and/or virtualized device 102, or the like). In the GUI 200, a SQL query of "select * from accounts;" has been sent from a control testing module 104b to a device testing module 104a and executed in a data store (e.g., a SQL database) of the associated device 102, and the device testing module 104a has returned the resulting data 202 to the control testing module 104b for display to the user in the GUI 200.

Figure 3:
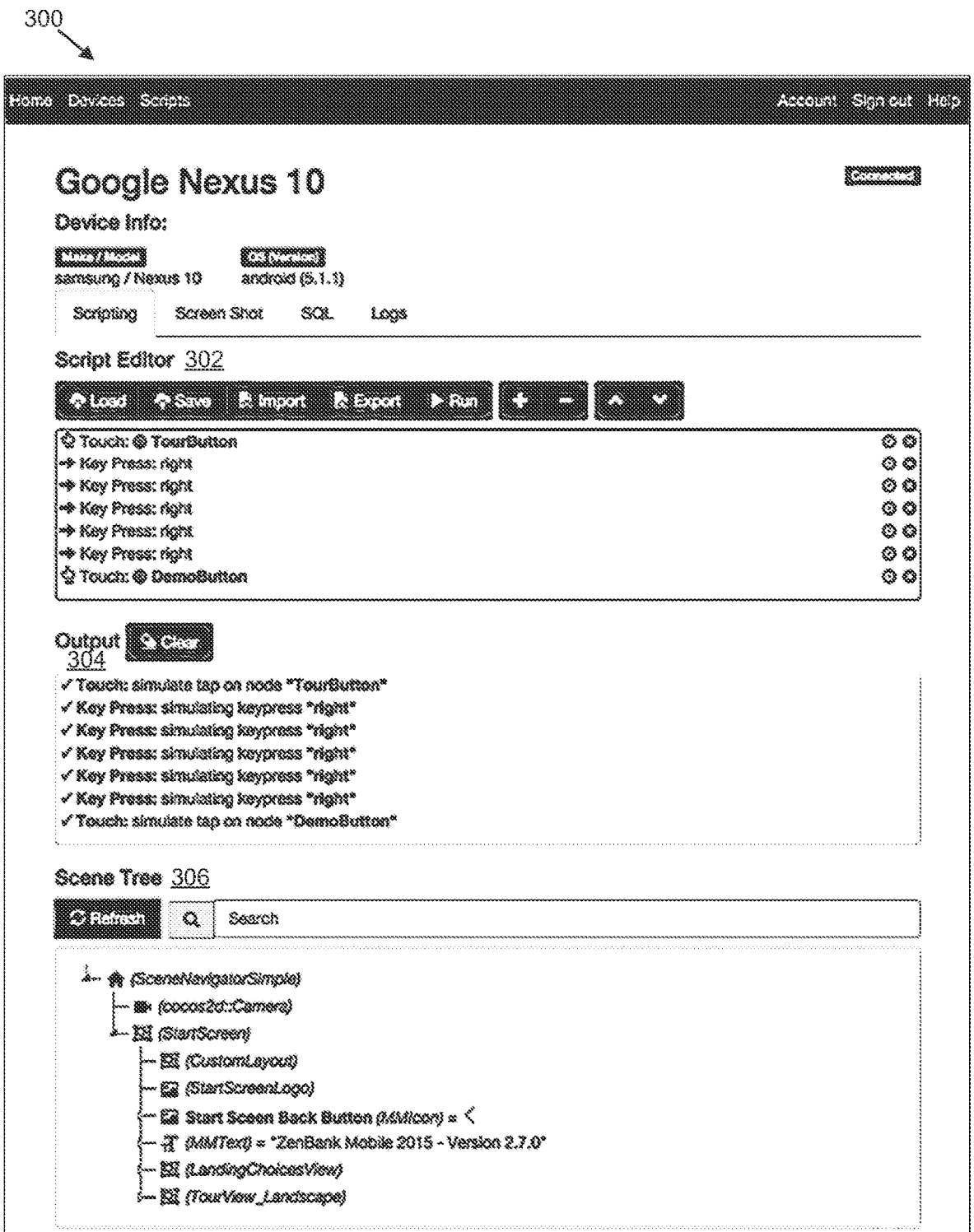
FIG. 3 is a schematic block diagram of a further embodiment of a graphical user interface for automated testing.

FIG. 3 depicts a further embodiment of a graphical user interface (GUI) 300 for automated testing. In the depicted embodiment, the GUI 300 may be provided to a user by a control testing module 104b, to display a scripting interface to a user with a script editor 302, a script output 304, and a hierarchical scene tree 306 with multiple nodes associated with objects displayed on a screen of a hardware device 102. The GUI 300 may allow the user to load, save, import, export, and/or run a script on one or more hardware devices 102. For example, the loaded script in the script editor 302 may include a list of simulated user interface events, such as "Touch Tour:Button," "Key Press: right," and "Touch: DemoButton." The GUI 300, in the depicted embodiment, also includes a listing of output 304 of the executed script and a hierarchical scene tree 306 allowing the user to select user input elements (e.g., camera/view, screen, layout, logo, button, icon, text, view, and the like) for use in the script (e.g., as a target of a user input event such as a touch, swipe, pinch, drag, select, click, right-click, or the like). In certain embodiments, a user may dynamically alter a parameter of a node in the scene tree 306, and a control testing module 104b may send the altered parameter to a device testing module 104a, which updates the altered parameter on the associated hardware device 102 in real time, during execution of an application associated with the hierarchical scene tree 306, or the like.

In certain embodiments, a GUI 300 may list and/or allow a user to select one of multiple connected/available devices 102, which may each be running one or more scripts in parallel, even though the devices 102 may include a combination of one or more simulated/virtualized devices 102 and one or more hardware devices 102, from different platforms (e.g., different makes/models, operating system versions, or the like).

Figure 4:
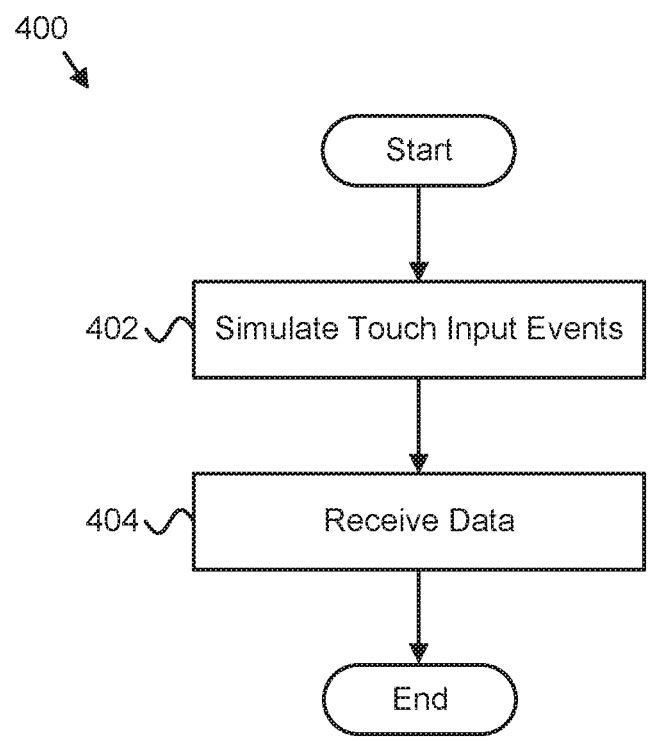
FIG. 4 is a schematic flow chart diagram illustrating one embodiment of a method for automated testing.

FIG. 4 depicts one embodiment of a method 400 for automated testing. The method 400 begins and a hardware server device 110 (e.g., a testing module 104) simulates 402 one or more user input events (e.g., touch input events) on an array of mobile hardware devices 102 over a data network 106. A hardware server device 110 (e.g., a testing module 104) receives 404 data associated with the simulated 402 one or more user input events (e.g., touch input events) from the mobile hardware devices 102 over the data network 106, and the method 400 ends.

Figure 5:
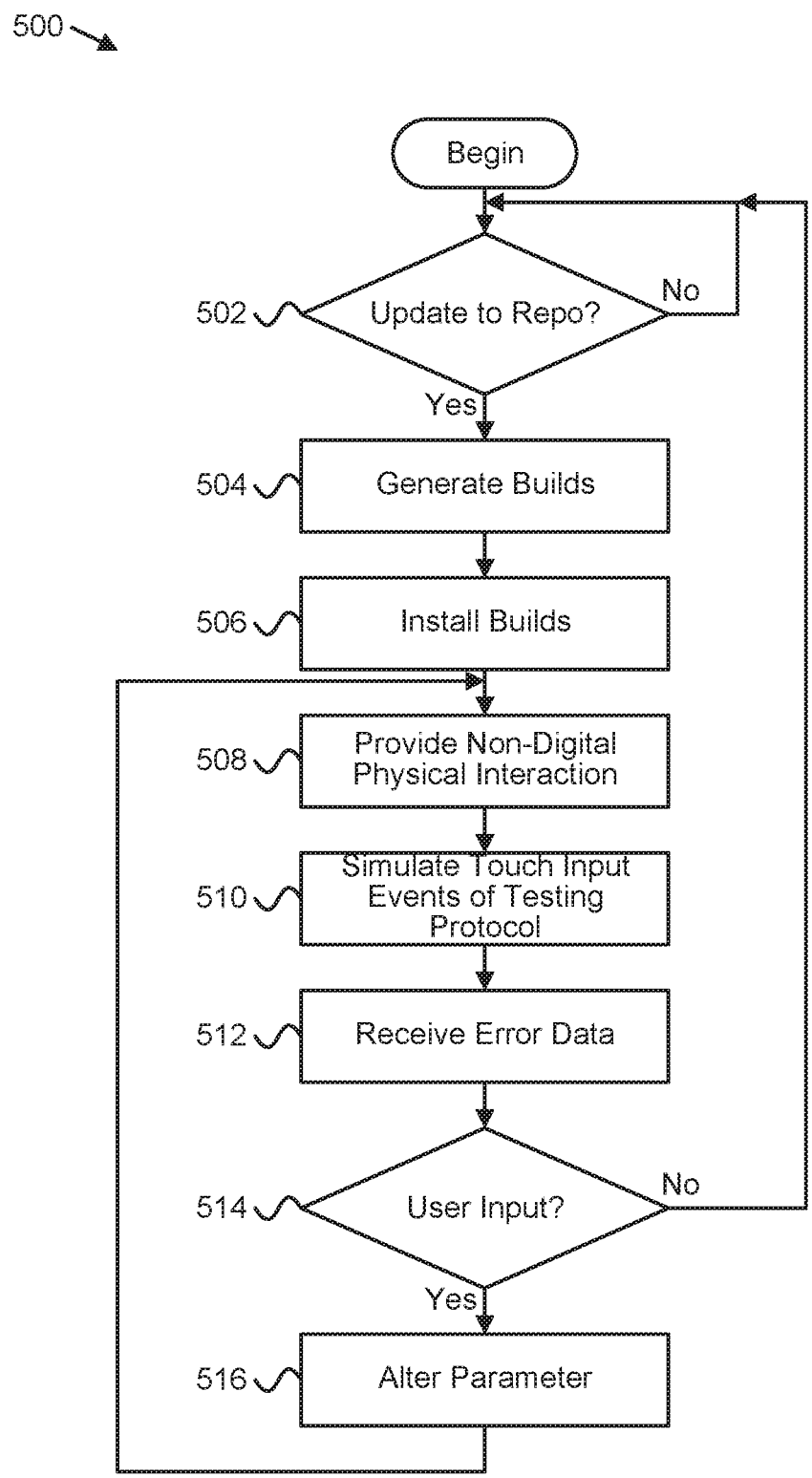
FIG. 5 is a schematic flow chart diagram illustrating one embodiment of another method for automated testing.

FIG. 5 depicts one embodiment of a method 500 for automated testing. The method 500 begins and a hardware server device 110 (e.g., a testing module 104) monitors 502 a repository of computer executable code for an array of mobile hardware devices 102. If the hardware server device 110 (e.g., a testing module 104) does not detect 502 an update to the computer executable code of the repository, the hardware server device 110 (e.g., a testing module 104) continues to monitor 502 the repository. In response to detecting 502 an update to computer executable code of the repository, the hardware server device 110 (e.g., a testing module 104) generates 504 one or more builds for the mobile hardware devices 102 using the update 502 to the computer executable code of the repository.

The hardware server device 110 (e.g., a testing module 104) installs 506 the generated 504 one or more builds on the mobile hardware devices 102. The hardware server device 110 (e.g., a testing module 104) provides 508 an automated, non-digital physical interaction to one or more mobile hardware devices 102. The hardware server device 110 (e.g., a testing module 104) simulates 510 one or more user input events (e.g., touch input events) of a testing protocol for the one or more generated 504 builds on the array of mobile hardware devices 102 over a data network 106. The hardware server device 110 (e.g., a testing module 104) receives 512 error data associated with the simulated 510 one or more user input events (e.g., touch input events) from the mobile hardware devices 102 over the data network 106.

The hardware server device 110 (e.g., a testing module 104) determines 514 whether or not user input has been received (e.g., user input altering a parameter of one or more nodes of a hierarchical scene tree or the like). If the hardware server device 110 (e.g., a testing module 104) does not detect 514 user input, the hardware server device 110 (e.g., a testing module 104) continues to monitor 502 updates to the repository and the method 400 continues. In response to detecting 514 user input altering a parameter, the hardware server device 110 (e.g., a testing module 104) alters 516 the parameter on an associated mobile hardware device 102 (e.g., altering a size, a position, a speed, a color, a source file, a database, or the like associated with text, an image, an animation, a video, a table, a color, a movement, and/or another object of a node of a scene tree), and the hardware server device 110 (e.g., a testing module 104) may re-provide 508 the automated non-digital physical interaction, re-simulate 510 the one or more user input events (e.g., touch input events), and receive 512 additional error data, each based on the altered 516 one or more parameters.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   at least one mechanical actuator; and
   one or more hardware server devices in communication with the at least one mechanical actuator and with an array of mobile hardware devices over a data network, the at least one mechanical actuator providing non-digital physical interaction to at least one of the mobile hardware devices, the one or more hardware server devices configured to:
      simulate one or more touch input events on the mobile hardware devices over the data network with a delay period between each of the simulated one or more touch input events to simulate a user's natural pauses when interacting with a mobile hardware device; and
      receive data associated with the simulated one or more touch input events and the non-digital physical interaction from the mobile hardware devices over the data network.

2. The apparatus of claim 1, wherein the one or more hardware server devices are configured to visit one or more locations of a server of a third party service provider without downloading data from the one or more locations of the third party service provider to simulate a user event at the third party service provider.

3. The apparatus of claim 2, wherein the one or more hardware server devices are configured to wait the delay period between visiting each of the one or more locations.

4. The apparatus of claim 2, wherein the one or more hardware server devices are configured to use a certain scroll pattern when visiting each of the one or more locations.

5. The apparatus of claim 1, wherein the simulated one or more touch input events comprise simulated user interface events on the mobile hardware devices.

6. The apparatus of claim 1, wherein the one or more hardware server devices are configured to provide data from the mobile hardware devices related to the simulated touch input events.

7. The apparatus of claim 6, wherein the data related to the simulated touch input events comprises one or more of error data for the mobile hardware devices, a screenshot, a hierarchical scene tree, a log, a value of a runtime variable of an application, a value of a memory pointer used by the application, and an identifier of an application executing on the mobile hardware devices.

8. The apparatus of claim 6, wherein the one or more hardware server devices are configured to request the data related to the simulated touch input events from the mobile hardware devices via an interface for the mobile hardware devices.

9. The apparatus of claim 1, wherein the one or more hardware server devices are configured to execute one or more scripts that comprise commands for simulating the one or more touch input events on the mobile hardware devices.

10. The apparatus of claim 9, wherein the one or more hardware server devices are configured to translate the commands for simulating the one or more touch input events for different platforms executing on the mobile hardware devices.

11. The apparatus of claim 9, wherein the one or more scripts are configured to test at least a portion of a graphical user interface of the mobile hardware devices using the simulated one or more touch input events.

12. The apparatus of claim 1, wherein the mobile hardware devices display associated interactions graphically on electronic displays of the mobile hardware devices in response to the simulated one or more touch input events.

13. A method comprising:
electrically triggering, with a rotate command, at least one mechanical actuator to rotate a frame to successively present different faces of the frame to a camera of a mobile hardware device;
simulating one or more touch input events on the mobile hardware device with a delay period between each of the simulated one or more touch input events for each successively presented different face of the frame to simulate a user's natural pauses when interacting with the mobile hardware device; and
receiving data associated with the simulated one or more touch input events and the camera of the mobile hardware device from the mobile hardware device over a data network.

14. The method of claim 13, further comprising visiting one or more locations of a server of a third party service provider without downloading data from the one or more locations of the third party service provider and with the delay period between visiting each of the one or more locations to simulate a user event at the third party service provider.

15. The method of claim 13, wherein the simulated one or more touch input events comprise simulated user interface events on the mobile hardware device.

16. The method of claim 13, further comprising providing data from the mobile hardware device related to the simulated touch input events, the data related to the simulated touch input events comprising one or more of error data for the mobile hardware device, a screenshot, a hierarchical scene tree, a log, a value of a runtime variable of an application, a value of a memory pointer used by the application, and an identifier of an application executing on the mobile hardware device.

17. The method of claim 13, further comprising executing one or more scripts that comprise commands for simulating the one or more touch input events on the mobile hardware device.

18. The method of claim 17, further comprising translating the commands for simulating the one or more touch input events for different platforms executing on the mobile hardware device.

19. The method of claim 17, wherein the one or more scripts are configured to test at least a portion of a graphical user interface of the mobile hardware devices using the simulated one or more touch input events.

20. An apparatus comprising:
means for rotating a frame to successively present different faces of the frame to a camera of a mobile hardware device;
means for simulating one or more touch input events on the mobile hardware device with a delay period between each of the simulated one or more touch input events for each successively presented different face of the frame to simulate a user's natural pauses when interacting with the mobile hardware device; and
means for receiving data associated with the simulated one or more touch input events from the mobile hardware device over the data network.

* * * * *